US006962066B2

(12) United States Patent
Larsen et al.

(10) Patent No.: US 6,962,066 B2
(45) Date of Patent: Nov. 8, 2005

(54) LOCKING ARRANGEMENT FOR A DOOR

(75) Inventors: Allan R Larsen, Helsinge (DK); Henning Kummerfeldt, Jyllinge (DK)

(73) Assignee: Servial CC ApS, Helsinge (DK)

( * ) Notice: Subject to any disclaimer, the term of this patent is extended or adjusted under 35 U.S.C. 154(b) by 0 days.

(21) Appl. No.: 10/847,327

(22) Filed: May 18, 2004

(65) Prior Publication Data

US 2004/0211231 A1 Oct. 28, 2004

Related U.S. Application Data

(63) Continuation of application No. PCT/DK02/00829, filed on Dec. 10, 2002.

(30) Foreign Application Priority Data

Dec. 10, 2001 (DK) ........................................ 2001 01830

(51) Int. Cl.[7] ................................................ B60R 25/02

(52) U.S. Cl. ....................... 70/3; 70/34; 70/56; 70/211; 292/207; 292/218; 292/283; 292/DIG. 32

(58) Field of Search ........................... 70/211, 2, 3, 34, 70/54–56, 181, 212; 292/DIG. 32, 218, 281–284, 327–329, 205, 207, 208

(56) References Cited

U.S. PATENT DOCUMENTS

| | | | | | |
|---|---|---|---|---|---|
| 294,560 | A | * | 3/1884 | Woodrich et al. | 70/86 |
| 671,792 | A | * | 4/1901 | Comber | 292/2 |
| 1,877,798 | A | * | 9/1932 | Briggs et al. | 292/348 |
| 2,843,413 | A | * | 7/1958 | Martin | 292/348 |
| 2,905,495 | A | * | 9/1959 | Adamson | 292/244 |
| 4,627,248 | A | * | 12/1986 | Haworth | 70/134 |
| 4,988,133 | A | * | 1/1991 | Shih | 292/191 |
| 5,211,042 | A | * | 5/1993 | Watanuki | 70/252 |
| 5,390,768 | A | * | 2/1995 | Borkowski | 188/112 R |
| 5,489,128 | A | * | 2/1996 | Florian | 292/1.5 |
| 6,442,982 | B1 | | 9/2002 | Larsen et al. | 70/3 |
| 6,553,798 | B1 | * | 4/2003 | Larsen et al. | 70/211 |

FOREIGN PATENT DOCUMENTS

WO WO 98/57018 12/1998

* cited by examiner

*Primary Examiner*—Lloyd A. Gall
(74) *Attorney, Agent, or Firm*—Winston & Strawn LLP

(57) ABSTRACT

A locking arrangement serving for locking a door hinged on a casing on e.g. a container by a combination or key lock. The locking arrangement comprises a rotatable closing rod for keeping the door closed by engaging the casing in a closed position; a fitting having a U-shaped part encompassing at least a length of the closing rod; two flushing locking holes made with one hole in each of the opposite walls of the U-shaped part; a transverse hole made in the closing rod and flushing with the locking holes in the closed position; and a bolt having a first section provided with a head, and a second section displaceably mounted in the lock between a locked inner position and an unlocked outer position; whereby the locking arrangement is locked when the bolt is extending through the transverse hole and the locking holes in locked inner position. The first section of the bolt is a separate part for detachably being assembled to its second section, whereby the locking arrangement continuously can function with a bolt head acting as seal without risk of the locking mechanism of the lock thereby being damaged or ruined by impurities or moisture.

11 Claims, 9 Drawing Sheets

LOCKING ARRANGEMENT FOR A DOOR

CROSS-REFERENCE TO RELATED APPLICATIONS

This application is a continuation of International application PCT/DK02/00829 filed Dec. 10, 2002, the entire content of which is expressly incorporated herein by reference thereto.

BACKGROUND ART

The invention relates to a locking arrangement for locking a door hinged to a casing by means of a combination or key lock, and of the kind comprising a rotatable closing rod for keeping the door closed by engaging the casing in a closed position; a fitting having a U-shaped part encompassing at least a length of the closing rod; two flushing locking holes made with one hole in each of the opposite walls of the U-shaped part; a transverse hole made in the closing rod and flushing with the locking holes in the closed position; and a bolt having a first section provided with a head, and a second section mounted in the lock displaceable between a locked inner position and an unlocked outer position; whereby the locking arrangement is locked when the bolt is extending through the transverse hole and the locking holes in locked inner position.

Such a locking arrangement is known from U.S. Pat. No. 6,442,982, the entire disclosure of which is expressly incorporated herein by reference in the present description. This known locking arrangement is intended e.g., for containers that are to cross country borders, and the locking arrangement is therefore sealed by a seal that is broken at customs checks.

In this case, the seal consists of an integrated head on the bolt. Near the head, the bolt can be designed with a break indicator in form of a circumferential weakening groove allowing the head to be cut or broken off. Alternatively, the head is cut off by means of a bolt cutter or is sawn off.

As the head cannot get through the holes of the locking arrangement, the bolt has to be pushed through the holes from one side of the fitting in order to be able to engage the lock on the other side of the fitting. During this, the second end part of the bolt could pick up impurities which it will carry along into the lock upon assembling, just as moisture could enter the lock when the bolt is pulled out. The impurities and the moisture could damage or ruin the delicate locking mechanism of the lock.

When the door is to be opened, the lock is unlocked whereby the bolt automatically is driven out into the outer position by a spring. Then, the head is removed in one of the above-mentioned ways, the broken bolt pulled out of the holes of the locking arrangement together with the lock, and the closing rod rotated free of its engagement with the closing rod, after which the door can be opened.

When the door is to be sealed again, the broken bolt is removed from the lock which is assembled with a new bolt in the way described above.

This process normally takes place many times during the life of the locking arrangement at the risk of the lock gradually starting to malfunction. As the locking arrangement in itself is burglarproof, the very serious problem might arise that it will not be possible or at least be very difficult to obtain access to the content in the full container. Accordingly, improvements in these type devices are desirable, and they are now provided by the present invention.

SUMMARY OF THE INVENTION

In one aspect of the invention, a locking arrangement of the kind mentioned in the opening paragraph is provided that can function continuously without any risk of the mechanism of the lock during this getting soiled and/or attacked by moisture.

In a second aspect of the invention, a locking arrangement of the kind mentioned in the opening paragraph is provided that has a bolt with a head that can function as seal.

In a third aspect of the invention, a locking arrangement of the kind mentioned in the opening paragraph is provided that has a bolt with a detachably mounted head.

In a fourth aspect of the invention, a locking arrangement of the kind mentioned in the opening paragraph is provided that has a simple and inexpensive structure.

According to the invention, the first section of the bolt is a separate part for detachably joining it to its second section. This involves the very considerable advantage that the second section can remain in the lock permanently, thereby sparing the lock from getting soiled or exposed to moisture even if the locking arrangement is locked and unlocked many times.

In a preferred embodiment, the first section of the bolt is inseparably assembled by a separate head and a separate rod. The head then functions as a seal that can be removed when the lock is unlocked and the bolt thereby is pushed out to its unlocked outer position by a spring. The head can e.g. be sawn, cut, snapped or broken off the separate rod of the first section.

The head is broken or snapped off this rod in especially easy manner if a circumferential groove is made in the first section of the bolt near the head.

If the head is removed, the remaining part of the first section together with the second section can readily be pulled out of the holes of the locking arrangement without the second section leaving the engagement with the lock any time during this. Thereby, the risk of the delicate mechanism of the lock being exposed to moisture and impurities that might make the lock malfunction is eliminated.

To further effectively prevent moisture and impurities from entering the lock, at least one packing can furthermore be mounted between the lock and the bolt.

When the locking arrangement is to be used again for locking and sealing the door, the now destroyed first section of the bolt is removed and replaced by a new one. Then, the assembled bolt is pushed through the holes of the locking arrangement, after which the first section and a new head are inseparably assembled, and the bolt is manually pushed back to its inner position in the lock which in conclusion is locked.

In this position, the head can advantageously be pushed into an aperture in the fitting so that it is not accessible to unauthorized persons.

According to the invention, the separate rod of the first section can be inseparably mounted in an aperture in the associate separate head by means of a split ring engaging in mounted state opposite grooves in the aperture and the closing rod respectively. Thereby, an easily mountable, permanent connection between the head and the rod is obtained, the head and rod can now only be separated by being destroyed.

In a second embodiment, the first section of the bolt can simply be the very head itself which is detachably joined to the second section of the bolt. In this case, the head can be designed with an undercut groove ending in the side of the head and arranged to detachably receive a correspondingly shaped first end part on the second section of the bolt.

In this case, the door can be unlocked without destroying any of the parts of the locking arrangement. Thus, the head and bolt can be readily reutilised for many successive locking operations.

BRIEF DESCRIPTION OF THE DRAWINGS

The invention will be explained in greater details below, describing only exemplary embodiments and giving further advantageous characteristics and technical functions with reference to the appended drawings, in which.

DETAILED DESCRIPTION OF PREFERRED EMBODIMENTS

Figure 1:
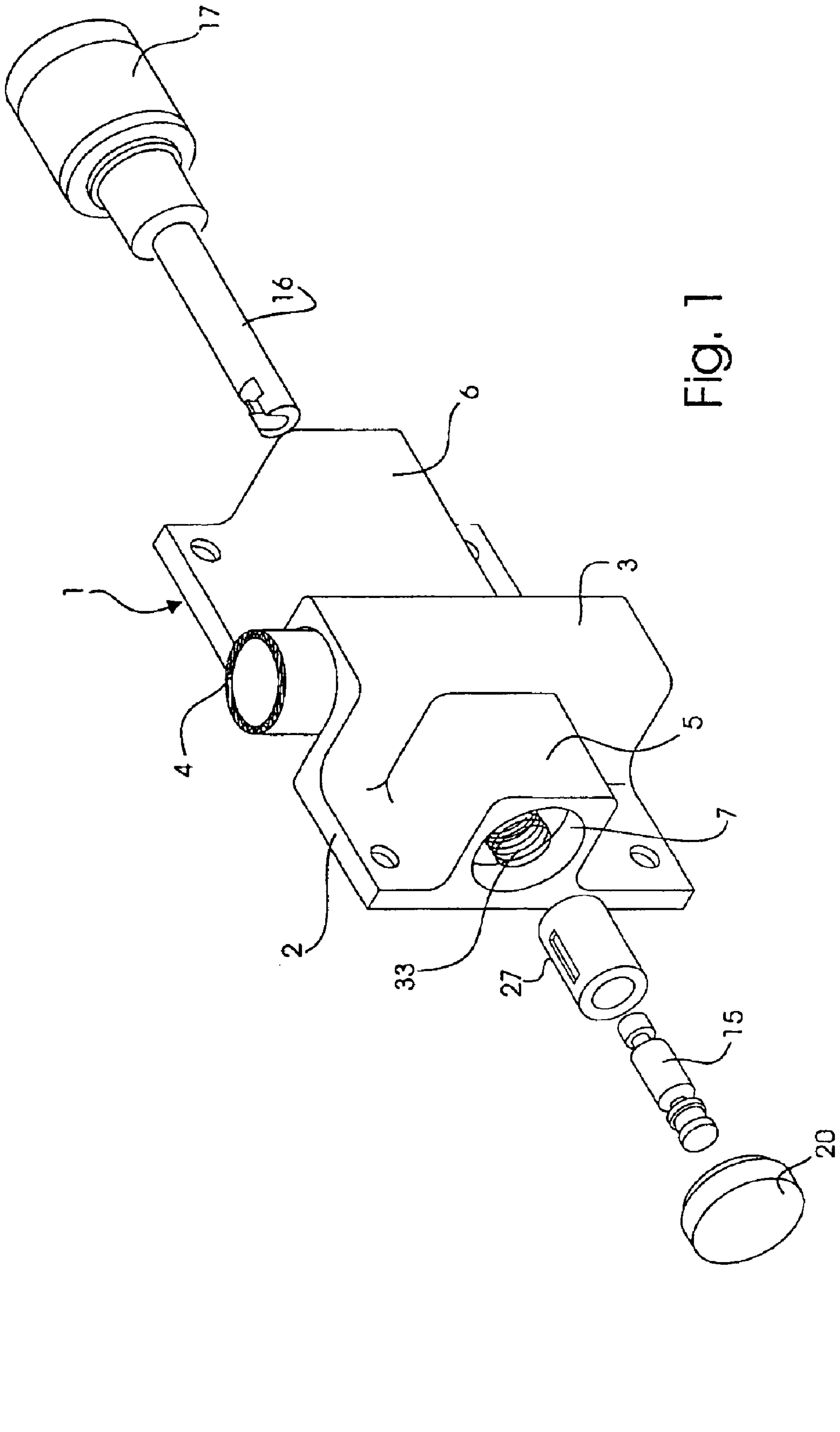
FIG. 1 is a perspective exploded view of a locking arrangement according to the invention.
Figure 2:
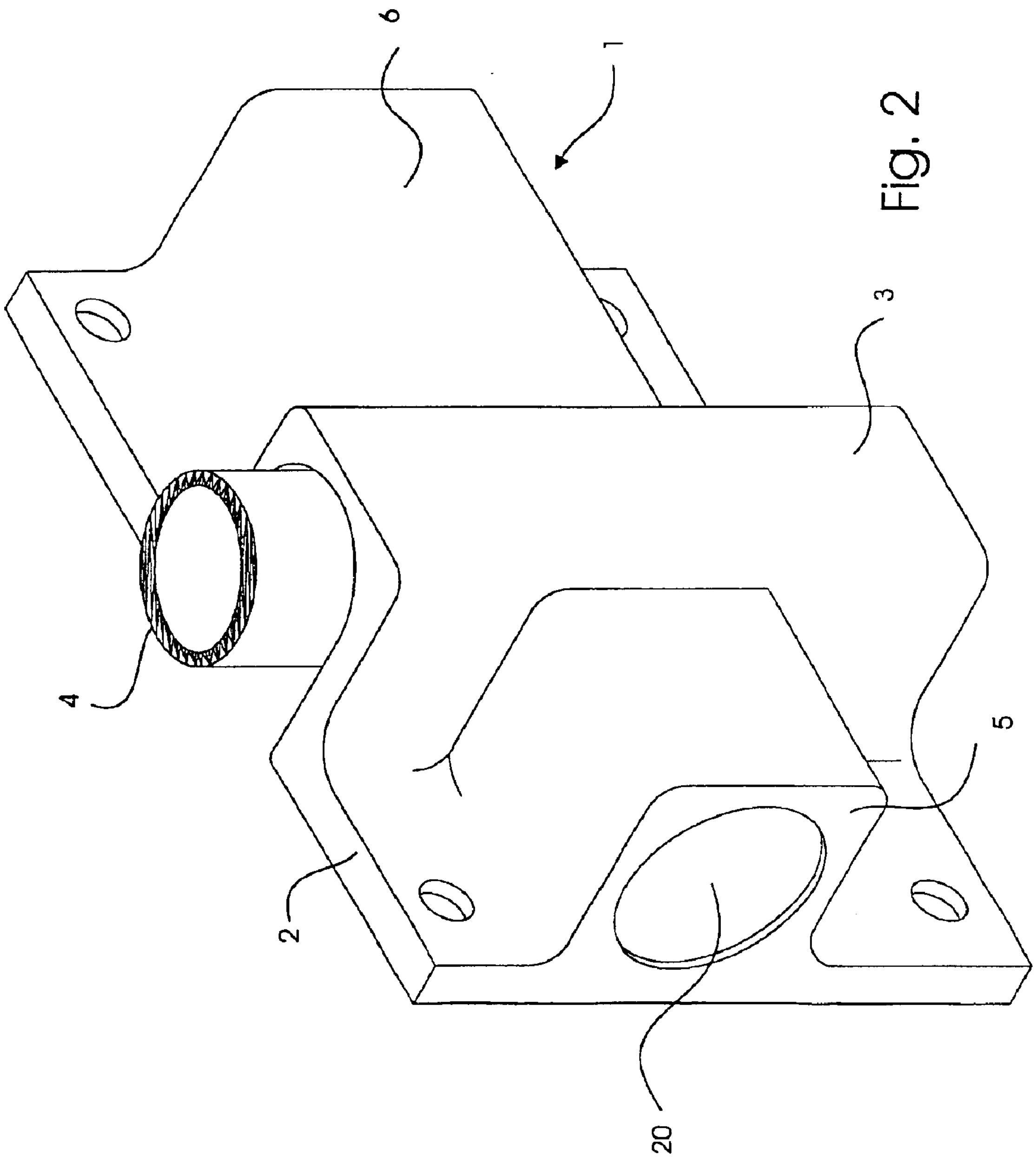
FIG. 2 shows the locking arrangement in FIG. 1 in assembled state.

In the following, it is assumed that the locking arrangement is for a door (not shown) hinged on a casing (not shown) on a container (not shown), and that an only fractionally shown closing rod is rotatably mounted on the door, with the rod serving for keeping the door closed by engaging the casing in a closed position.

FIGS. 1–4 show a locking arrangement according to the invention in one embodiment. This locking arrangement comprises a fitting 1 with a flange 2 for mounting on the door, and a U-shaped part 3 encompassing the rotatable closing rod 4 of the door. First and second transverse parts 5 and 6 respectively are furthermore made on either side of the U-shaped part. A first slot 7 having a first base 8 is made in the first transverse part 5, and a second slot 9 having a second base 10 in the second transverse part 6. The two bases 8 and 10 pass into or are joint with an area of each of their wall of the two opposite walls of the U-shaped part. In the bases 8 and 10, first and second locking holes 11 and 12 respectively are made that are flush with each other.

In the closing rod 4, a transverse hole 13 is furthermore made that is flush with the locking holes 11 and 12 in the closed position of the closing rod. In this position, a bolt 14 having first and second sections 15 and 16 respectively can be, as seen best in FIGS. 3 and 4, pushed through the three flushing holes 11, 12 and 13 of the locking arrangement. Thereby, the closing rod is kept locked in its closed position so that the door no longer can be opened.

Figure 3:
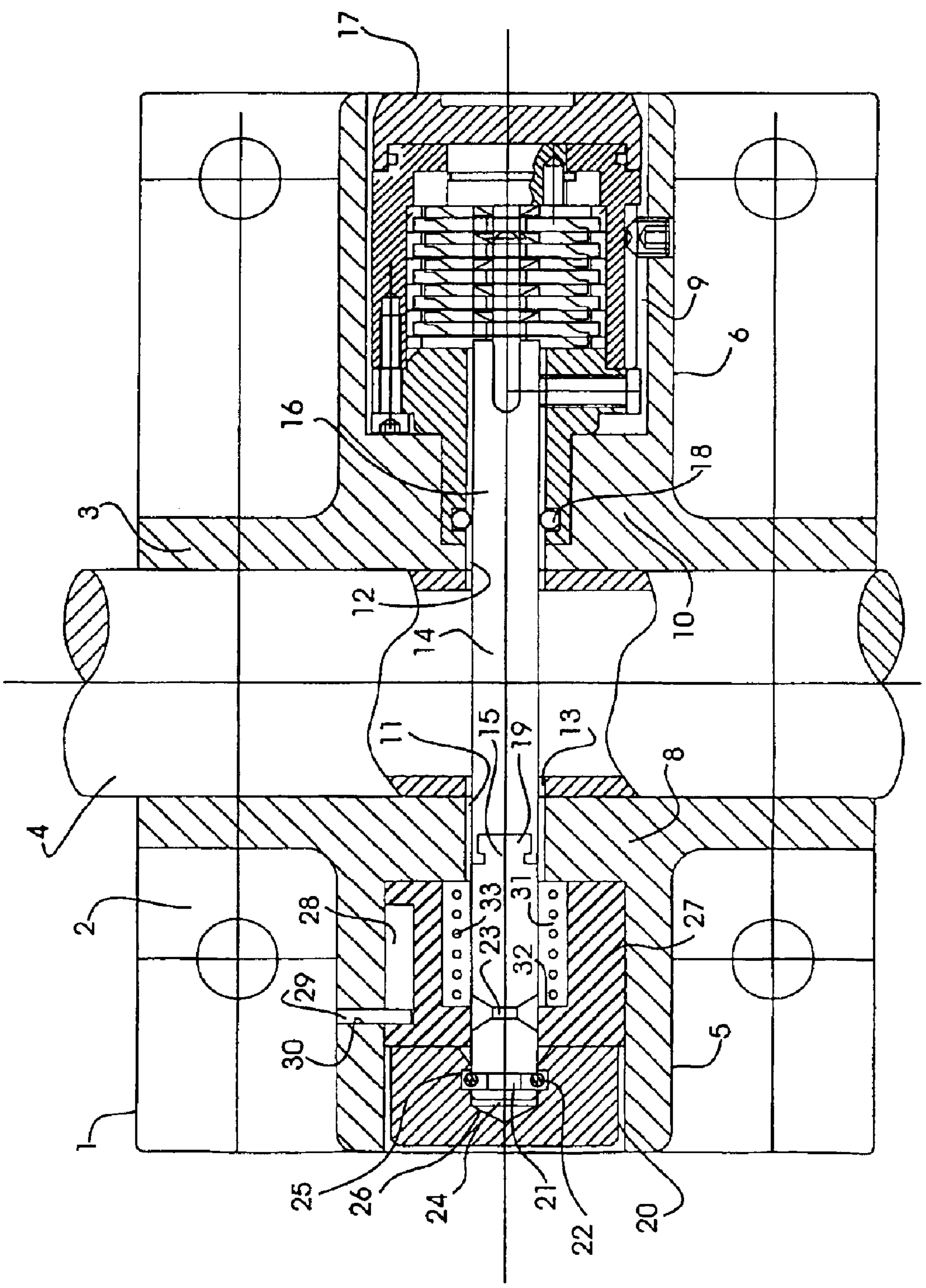
FIG. 3 is a sectional side elevational view of the locking arrangement in FIGS. 1 and 2 with a lock in locked state.
Figure 4:
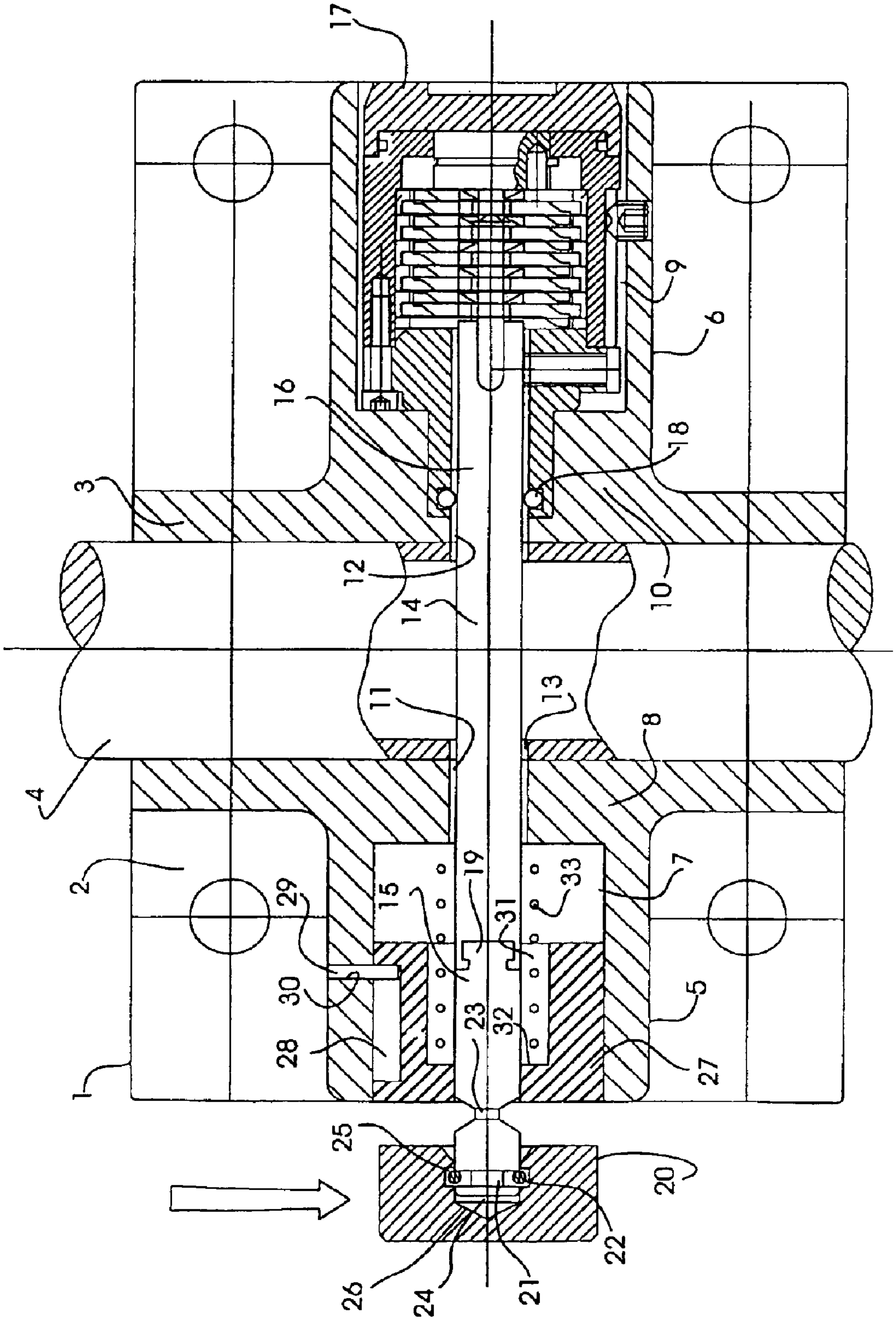
FIG. 4 shows the locking arrangement in FIG. 3 but with the lock in unlocked state.

The second section 16 of the bolt 14 is displaceably mounted in a lock 17 between the locked inner position of FIG. 3 and the unlocked outer position of FIG. 4. In both cases, the lock is guardedly located in the second slot 9. The lock is moreover of a design known per se and will therefore not be discussed in detail at this time.

A packing ring 18 between the second section of the bolt and the lock protects against impurities and moisture entering the delicate mechanism of the lock at the risk of the lock thereby malfunctioning.

The first and second sections 15 and 16 of the bolt are kept detachably joined by means of a connection 19 designed, in the case shown, as a T-piece on the first section 15 and a T-slot in the second section.

In assembled state, the bolt 14 is pushed in through the three flushing holes 11, 12 and 13 of the locking arrangement from the right side, seen in the figures, until the lock 17 is in place in the second slot 9. In unlocked state, the bolt will then be in the outer position of FIG. 4 with an end part extending out from the first slot 7. In this end part, a first circumferential groove 21 is designed for a split ring 22, and a second circumferential groove 23 serving as break indicator. At the transition to the end face, the end part of the first section is furthermore provided with a bevelling 26.

An aperture 24 having a circumferential groove 25 is made in the head 20. The bolt 14 is joined to this head by pushing the end part of the first section 15 into the aperture 24 of the head with the split ring 22 located in the groove 25 of the aperture. During this, the split ring is expelled by the bevelling 26 of the end part to subsequently jump into the first groove 21 of the end part. The head and the first section of the bolt are now inseparably assembled.

A hardened bushing 27 is displaceably mounted in the first slot 7 between the inserted position in FIG. 3 and the advanced position in FIG. 4. A longitudinal slot 28 is made in the bushing. A pin 29 inserted in this slot via a hole 30 in the wall of the first transverse part 5 ensures that the bushing cannot exit the slot unintentionally.

If so desired, the bushing 27 can be designed with several longitudinal slots 28 with associate pins 29.

An axially extending recess 31 having a base 32 is furthermore made in the bushing. A compression spring 33 acting between this base and the base 8 of the slot 7 serves for forcing the bolt 14 out to its unlocked outer position upon unlocking of the lock.

When the door is to be locked and sealed, it is closed after which its closing rod 4 is rotated into the closed position. The door can then only be reopened if the closing rod again is rotated out of its closed position.

In the closed position, the transverse hole 13 of the closing rod is flush with the locking holes 11 and 12 of the transverse parts. The bolt 14 detachably assembled by its first and second sections 15 and 16 is pushed through the flushing holes 11,12 and 13 until the lock is guardedly located in the second slot 9. An end part on the first section of the bolt will then extend out through the bushing 27 when the door is not locked. Then, the head 20 is inseparably mounted on this end part in the way described above, after which the head, against the action of the compression spring

33, is forced into the first slot. 7 in which the head is guarded against interference from unauthorized persons. Then, the lock is locked.

The door is now not only locked effectively but also sealed by means of the head 20 and the first section 15 of the bolt 14 in the following way.

At a customs check, e.g., the door of the container is demanded opened so that the customs officials can inspect its content. Therefore, the lock is unlocked whereby the compression spring 33 via the bushing 27 will force the bolt 14 out of its outer position in which the end part of the first section 15 is extending out through the bushing 27 which itself is stopped by the engagement of the pin 30 with the end of the longitudinal slot 28.

If so desired, the head can, as shown in FIG. 4, be pulled a little free of the bushing after which it, as indicated by the arrow, is knocked off by means of e.g. a hammer of the first section 15 of the bolt, said section thereby breaking off at the groove 23 serving as break indicator. During this, the first section 15 of the bolt is supported by the bushing 27 which in turn is supported in the slot 7 of the first transverse part 5.

Now, the bolt 14 with the lock 17 can be pulled out of the flushing holes 11, 12 and 13 of the locking arrangement after which the locking rod 4 can be rotated into free position and the door opened.

The door is locked and sealed again in the way described above, the broken first section of the bolt merely being replaced by a new one.

It is to be noted that the second section of the bolt did not have to leave its tight engagement with the lock at any time during this, and the lock can therefore not be damaged or made inoperative by moisture and impurities entering the locking mechanism of the lock in the course of time.

Figure 5:
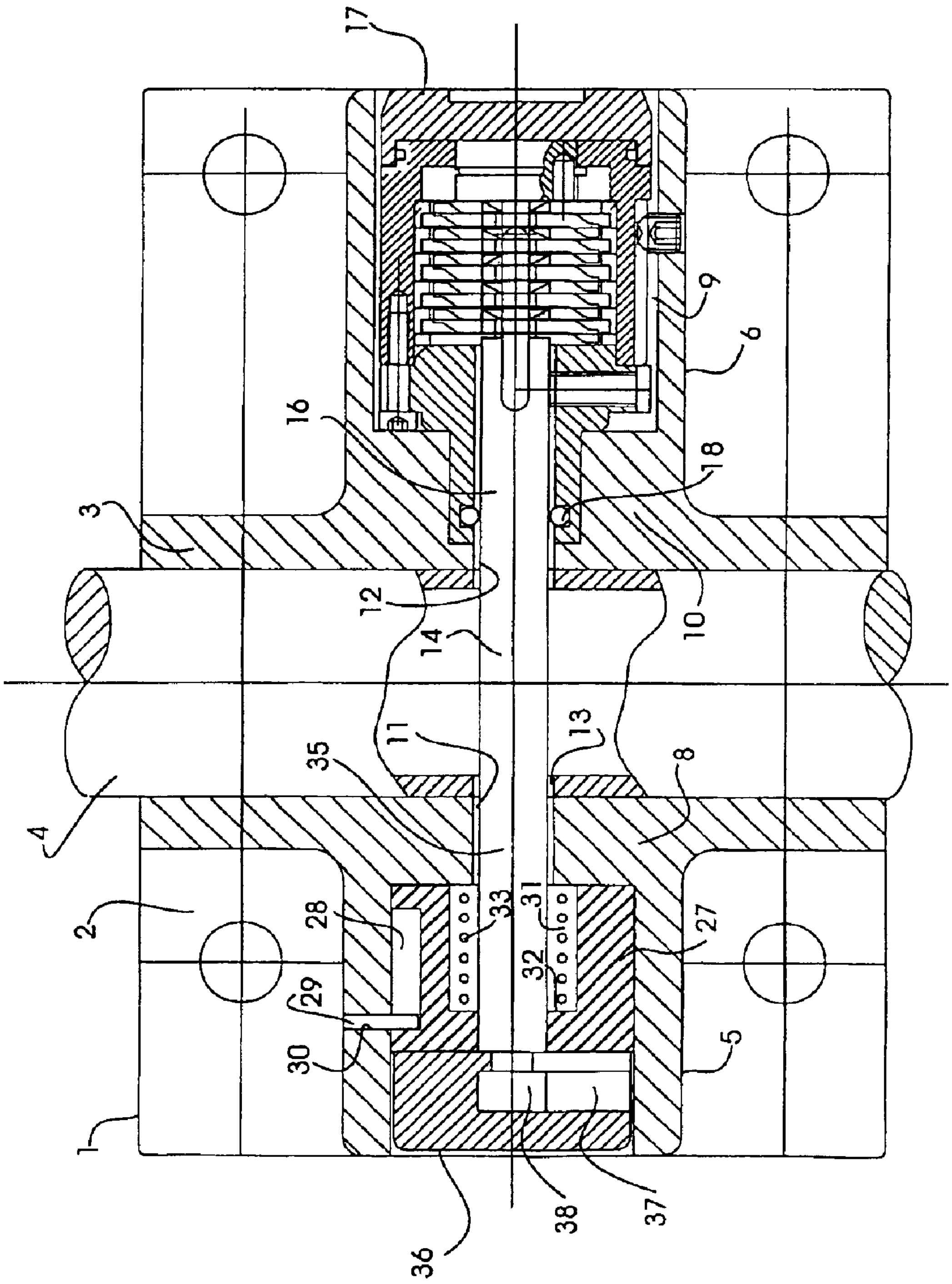
FIG. 5 is a sectional side elevational view of a second embodiment of a locking arrangement according to the invention with a lock in locked state.
Figure 6:
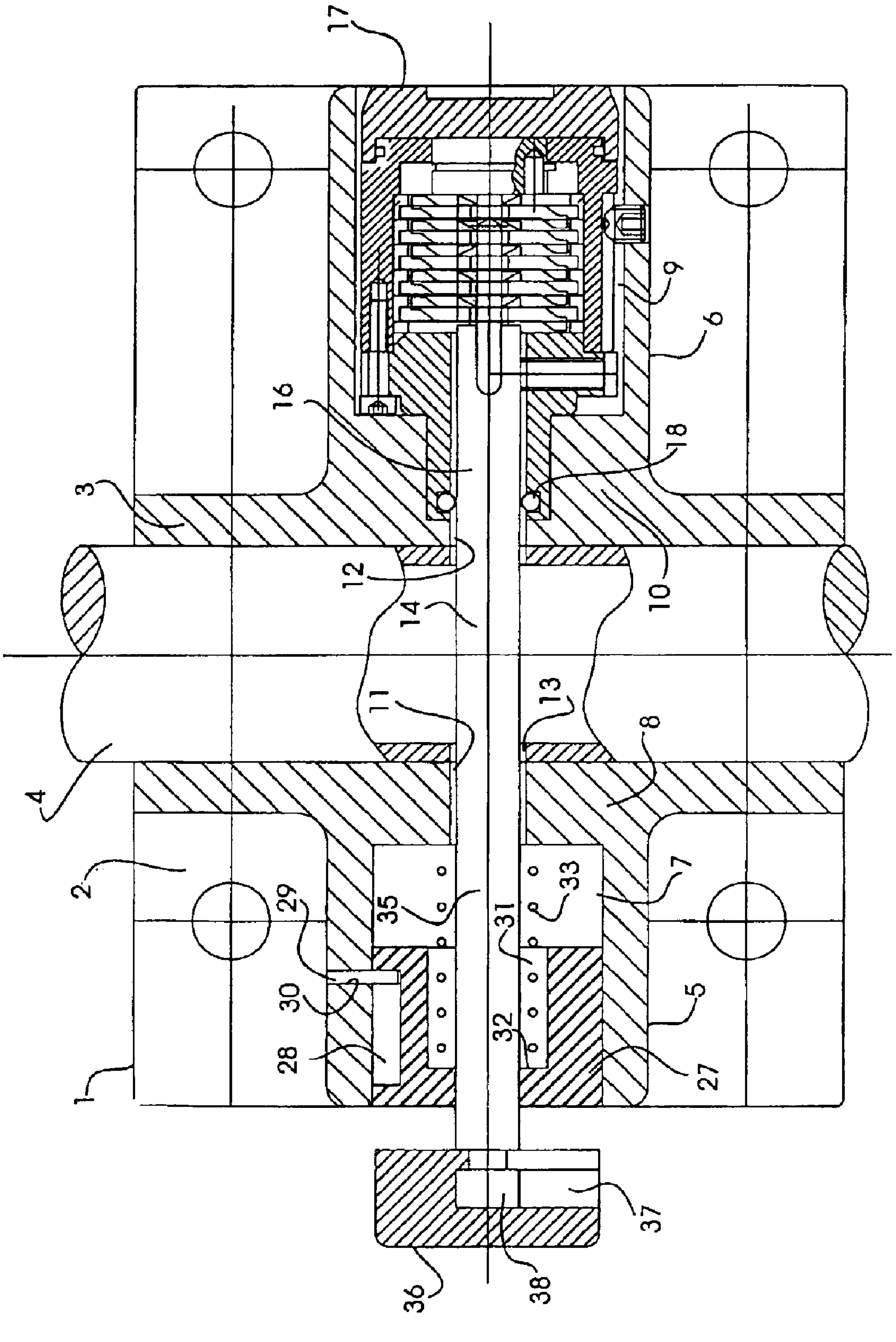
FIG. 6 shows the locking arrangement in FIG. 5 but with the lock in unlocked state.

FIGS. 5 and 6 show a second embodiment of a locking arrangement which essentially corresponds to the locking arrangement in FIGS. 1 to 4. The same reference numerals are therefore used for like parts.

In this embodiment, the second section 35 of the bolt 14 is extending up to the head 36 whereas the first section is this very head.

The head 36 and the second section 35 of the bolt are detachably joined by a connection consisting of a T-slot 37 made in the head and ending in the periphery of this head, and a corresponding T-piece 38 made in the second section of the bolt.

This solution offers the same effective protection against theft as the first embodiment of the locking arrangement described with reference to FIGS. 1 to 4 but can, contrary to this one, be used several times without it being necessary to break or replace any of the parts of the bolt.

Figure 7:
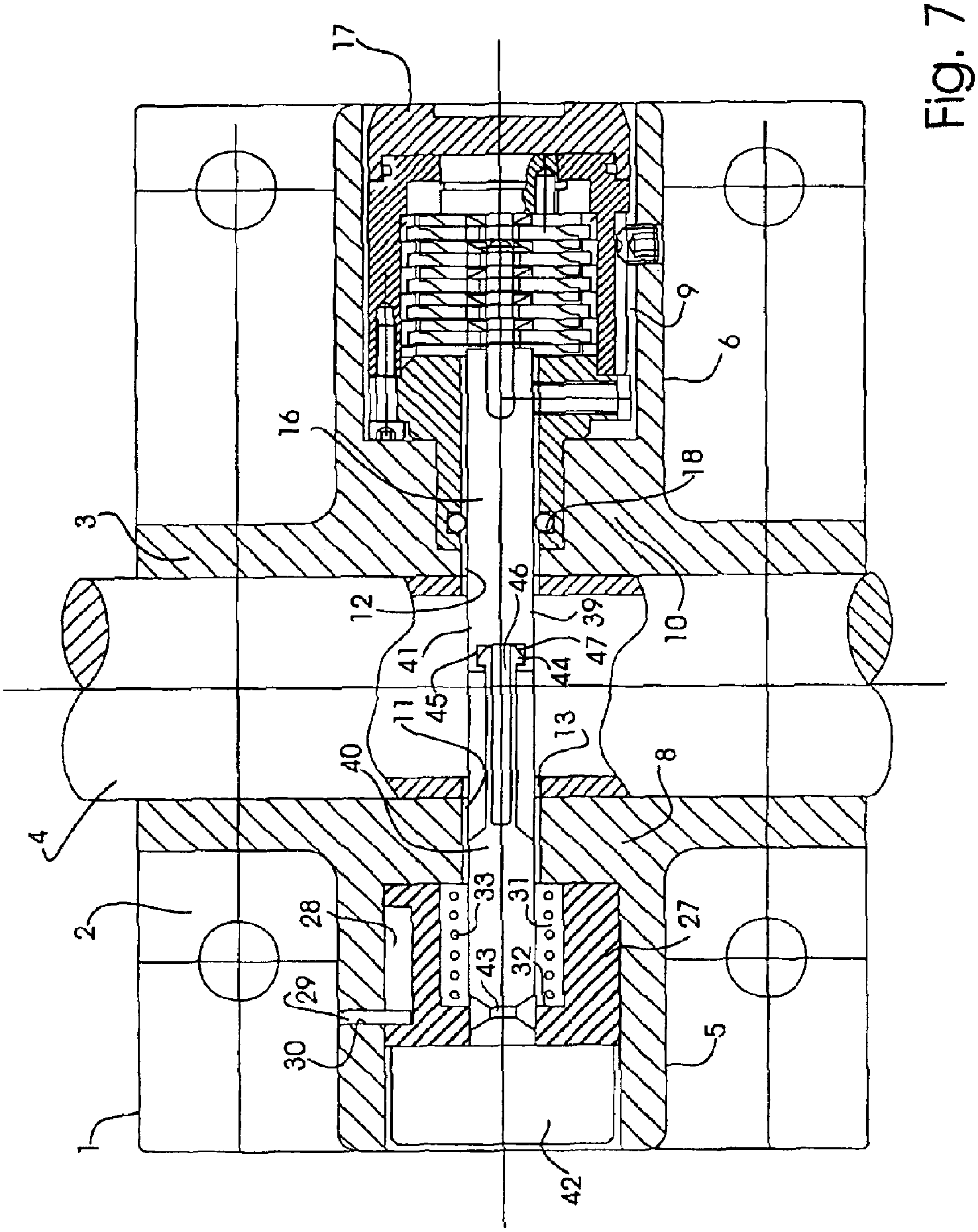
FIG. 7 is a sectional side elevational view of a third embodiment of a locking arrangement according to the invention with a lock in locked state.
Figure 8:
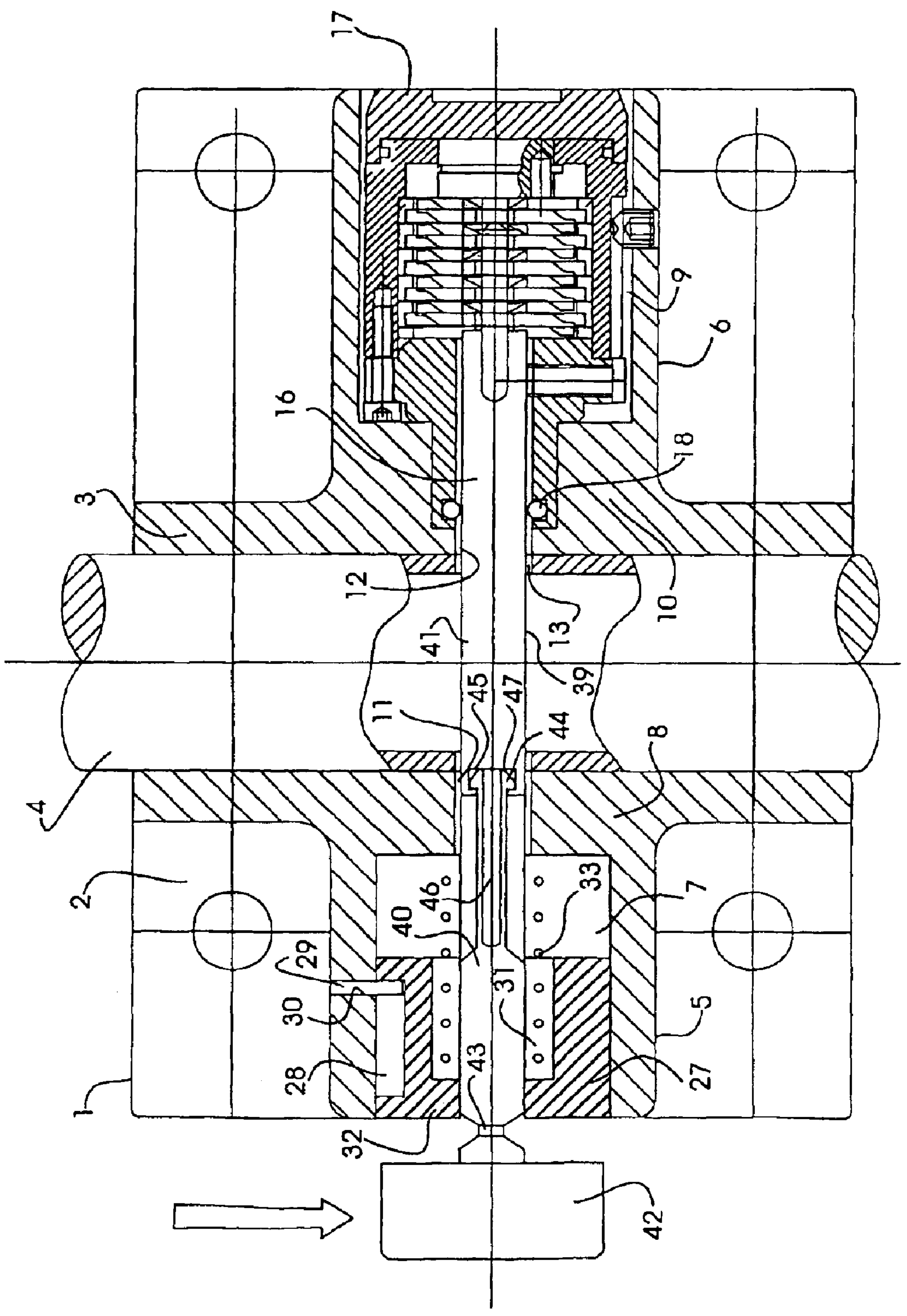
FIG. 8 shows the locking arrangement in FIG. 7 but with the lock in unlocked state.

FIGS. 7 and 8 show a third embodiment of a locking arrangement which also corresponds essentially to the locking arrangement in FIGS. 1 to 4. The same reference numerals are therefore used for like parts also in this case.

In this third embodiment, the locking arrangement has a bolt 39 having a first section 40 and a second section 41. The first section has an integrated head 42 and a circumferential groove 43 made close to this head and functioning as break indicator.

The two sections are detachably joined by means of a T-piece 44 on the first section and a T-slot 45 on the second section. The end part of the first section 40 facing the second section 41 is divided by a longitudinal split 46 into two halves each shaped as a leaf spring.

It is to be noted that the T-slot alternatively can be made on the first section and the T-piece on the second section.

When the locking arrangement is to be unlocked, the head is knocked or broken off the bolt in the same way as in the first embodiment, the bolt during this being in the unlocked outer position in FIG. 8. Then, the second section of the bolt, which still is hooked to the now destroyed first section, is pulled out of the locking arrangement so that the closing rod can be rotated to free position and the door opened.

Subsequently, the destroyed first section of the bolt is pulled axially free of the second section of the bolt, after the two leaf spring-shaped halves of the first section first have been pressed sufficiently together to allow the head of the T-piece to pass the opening of the T-slot. Alternatively, the two sections can be separated in transverse direction.

When the door is to be locked and sealed again, the closing rod 4 is rotated to its closed position, and the second section 41 of the bolt 39 with the lock 17 is pushed through the flushing holes 11, 12 and 13 of the locking arrangement.

Then a new first section 40 with the integrated head 42 is pushed into the locking arrangement from the opposite side until the T-piece 44 of the first section engages the T-slot 45 of the second section, the two leaf spring-shaped halves on the split end part of the first section during this being bent towards each other resiliently. To facilitate this operation, the end of the T-piece has a bevelling 47.

The two sections of the bolt are joined the easiest if the bolt is in its outer position. From this position, the head 42 is forced into the first slot 7 under the action of the compression spring 33. Thereby, the bolt 39 is brought into the inner position in which the lock 17 is locked.

The head 42 is now effectively guarded in the slot 7 where unauthorized persons cannot knock or break the head off the bolt.

Figure 9:
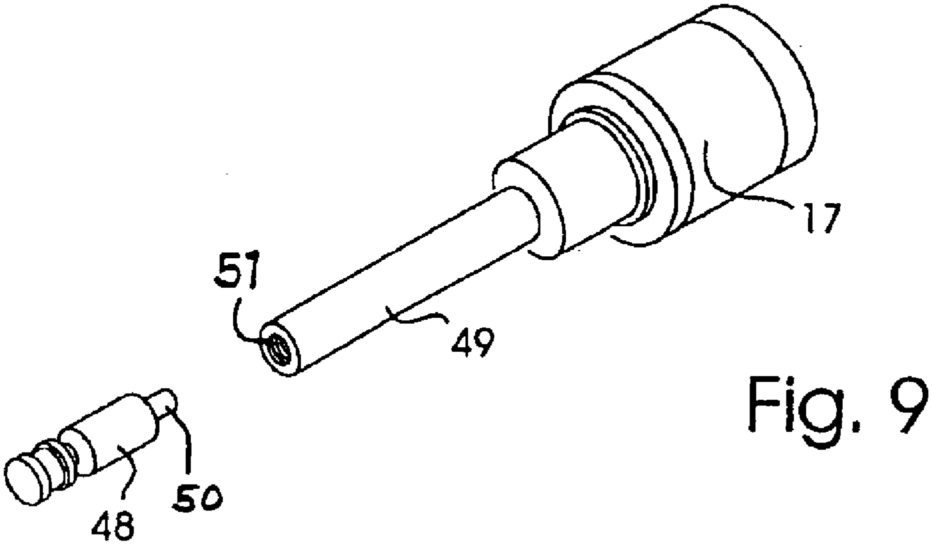
FIG. 9 is a perspective fractional view of a first embodiment of a detachable connection between a first and second section of a bolt which is part of the locking arrangement, FIG. 10 in a perspective fractional view of a second embodiment of a detachable connection between a first and second section of a bolt which is part of the locking arrangement.

FIG. 9 is a fractional view of a first embodiment of a detachable connection between first and second sections of a bolt. In the figure, only the first and second sections 48 and 49 and the lock 17 can be seen. In this embodiment the connection is composed of an external thread 50 on one of the sections and an internal thread 51 on the other section.

Figure 10:
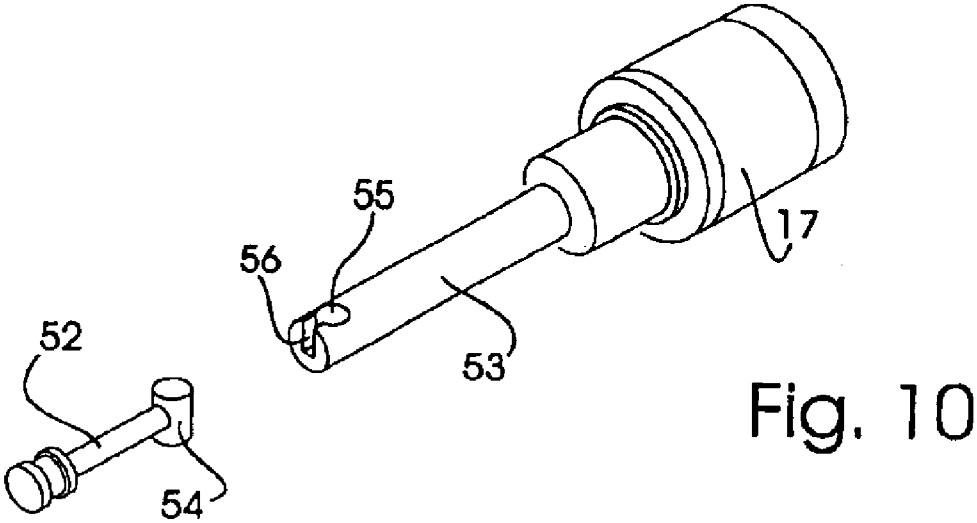

FIG. 10 is a fractional view of a second embodiment of a detachable connection between first and second sections of a bolt. In the figure, only the first and second sections 52 and 53 and the lock 17 can be seen. In this embodiment the connection is composed of a cross pin 54 on one of the sections and a corresponding slot 55 made crosswise in the other section and ending in the end face of this section via a split 56 having a width corresponding to the diameter of the first section of the bolt.

Figure 11:
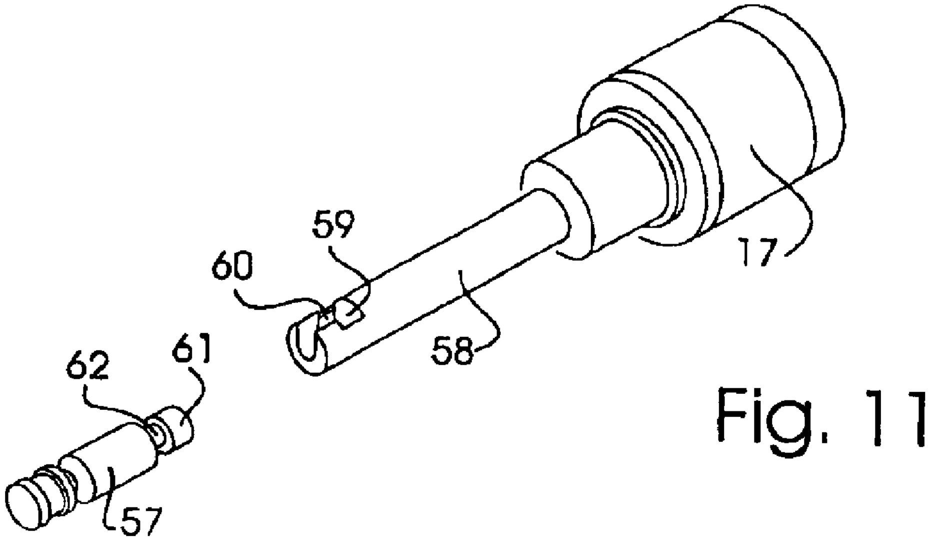
FIG. 11 is a perspective fractional view of a third embodiment of a detachable connection between a first and second section of a bolt which is part of the locking arrangement.

FIG. 11 is a fractional view of a third embodiment of a detachable connection between first and second sections of a bolt. In the figure, only the first and second sections 57 and 58 and the lock 17 can be seen. In this case, the connection is composed of a slot 59 with a narrowing 60 in one of the sections of the bolt and an end part 61 and circumferential groove 62 respectively shaped correspondingly to the slot and the narrowing in the other section.

The invention is described above and shown in the drawing with a bolt designed with a circumferential groove at the head functioning as break indicator allowing the head to be easily knocked or broken off the bolt.

Within the scope of the invention, the head can alternatively be cut off by means of a bolt cutter or sawn off. In these cases, the break indicator can be spared if so desired.

The locking arrangement according to the invention is made of materials that cannot or only can be broken up with much difficulty by ordinary tools.

It is especially important that the head, bushing and bolt of the locking arrangement are made of a strong material, such as e.g. hardened steel.

In the U-shaped part of the fitting, a hardened pipe (not shown) can furthermore be located that encompasses the closing rod. When the fitting is located directly above the engagement of the closing rod with the casing, the closing rod cannot at the same time be cut in two under the fitting but only in an area above the fitting. But even if the closing rod is cut in two in this way, the locking arrangement will however still be effectively locked as the engagement of the bolt with the remaining part of the closing rod is still intact.

The invention is described above on the basis of the fact that the locking arrangement is for a door in a container. However, the arrangement can just as well be used for a container having two doors, just as it, within the scope of the invention, advantageously can be used for any other kind of door, for example a door for a lorry having a closed trailer.

What is claimed is:

1. A locking arrangement for locking a door hinged on a casing by a lock that includes a rotatable closing rod for keeping the door closed by engaging the casing in a closed position; a fitting having a U-shaped part encompassing at least a length of the closing rod; two flushing locking holes made with one hole in each of the opposite walls of the U-shaped part; a transverse hole made in the closing rod and flushing with the locking holes in the closed position; and a bolt having a first section provided with a head, and a second section displaceably mounted in the lock between a locked inner position and an unlocked outer position; whereby the locking arrangement is locked when the bolt extends through the transverse hole and the locking holes in locked inner position, wherein the first section of the bolt is a separate part for detachably being assembled to its second section and that the first section of the bolt is inseparably assembled to a separate head.

2. The locking arrangement according to claim 1, wherein the lock is a combination lock or a key lock.

3. The locking arrangement according to claim 1, wherein the first section of the bolt includes a break indicator to identify where the head is to be snapped or broken off when the bolt is in its unlocked outer position.

4. The locking arrangement according to claim 3, wherein the break indicator is in the form of a circumferential groove for allowing the head to be snapped or broken off.

5. The locking arrangement according to claim 1, wherein the head is located in an aperture in the fitting in the locked inner position of the bolt.

6. The locking arrangement according to claim 1, wherein the detachable connection between the two sections of the bolt is a threaded joint having an external thread and an internal thread.

7. The locking arrangement according to claim 1, wherein the detachable connection between the two sections of the bolt is comprised of a cross pin on one of the sections and a corresponding slot made crosswise in the other section and ending in the end face of this section via a split having a width corresponding to the diameter of the first section of the bolt adjacent to the cross pin.

8. The locking arrangement according to claim 1, wherein the detachable connection between the two sections of the bolt is composed of a slot having a narrowing in one of the sections and an end part having a circumferential groove and shaped correspondingly to the slot and the narrowing in the other section.

9. The locking arrangement according to claim 1, wherein the first section is inseparably mounted in an aperture in the associated separate head by means of a split ring engaging corresponding grooves in the aperture and the rod respectively in mounted state.

10. The locking arrangement according to claim 1, wherein there is at least one packing ring for forming sealing between the second section of the bolt and the lock.

11. A locking arrangement for locking a door hinged on a casing by a lock that includes a rotatable closing rod for keeping the door closed by engaging the casing in a closed position; a fitting having a U-shaped part encompassing at least a length of the closing rod; two flushing locking holes made with one hole in each of the opposite walls of the U-shaped part; a transverse hole made in the closing rod and flushing with the locking holes in the closed position; a head with a T-slot in an end side of the head, and a bolt having a T-piece on a first end for detachable attachment to the head, the bolt having a section that is displaceably mounted in the lock between a locked inner position and an unlocked outer position; whereby the locking arrangement is locked when the bolt extends through the transverse hole and the locking holes in locked inner position.

* * * * *